Figures 1A, 1B:
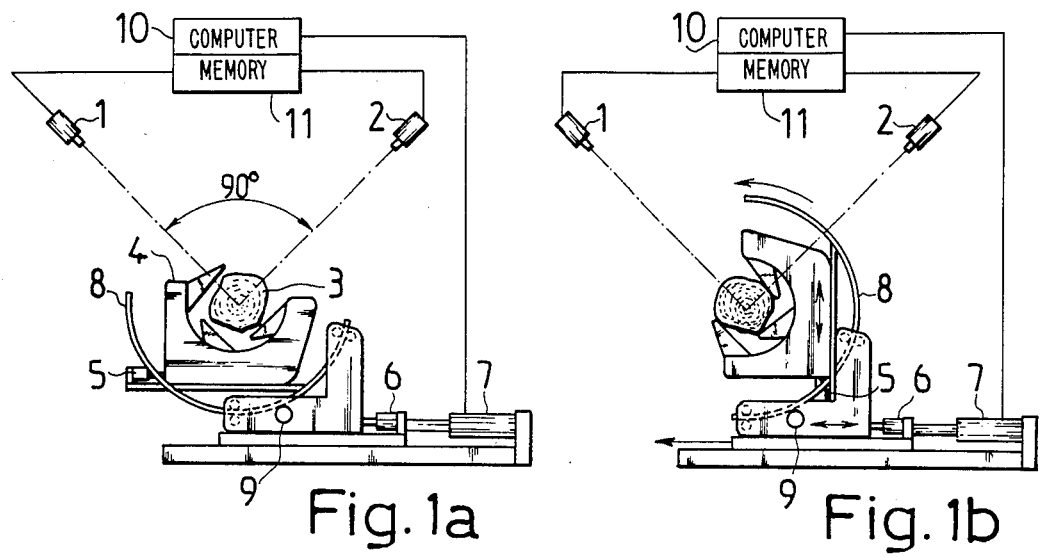

United States Patent [19]

Mahlberg et al.

[11] Patent Number: 4,737,031
[45] Date of Patent: Apr. 12, 1988

[54] METHOD AND DEVICE FOR DETERMINATION OF DESIRED MIDDLE LINE OF A CYLINDRICAL OBJECT SUCH AS A LOG

[75] Inventors: Olli Mahlberg, Touruniemi; Pauli Kuhno, Heikinkatu, both of Finland

[73] Assignee: Oy Wihl. Schauman Ab, Finland

[21] Appl. No.: 31,218

[22] Filed: Mar. 24, 1987

Related U.S. Application Data

[63] Continuation of Ser. No. 653,244, Sep. 5, 1984, abandoned.

[30] Foreign Application Priority Data

Jan. 6, 1983 [FI] Finland ............................. 830032

[51] Int. Cl.$^4$ .............................................. G01B 11/00
[52] U.S. Cl. .................................... 356/372; 356/385; 144/209 A; 144/357
[58] Field of Search ............... 356/384, 385, 386, 387, 356/372; 250/560; 144/356, 357, 209 A

[56] References Cited

U.S. PATENT DOCUMENTS

| | | |
|---|---|---|
| 3,724,958 | 4/1973 | Callan . |
| 3,746,065 | 7/1973 | Mason . |
| 3,787,700 | 1/1974 | Chasson .................... 356/386 X |
| 3,806,253 | 4/1974 | Denton . |
| 3,852,579 | 12/1974 | Sohn et al. ................. 356/387 X |
| 4,149,079 | 4/1979 | Ben-Zeev ........................ 250/360 |
| 4,152,767 | 5/1979 | Laliotis ........................... 356/386 |
| 4,197,888 | 4/1980 | McGee ........................... 356/384 |
| 4,248,532 | 2/1981 | Nosler ........................ 356/384 X |
| 4,397,343 | 8/1983 | Fields ......................... 356/384 X |

FOREIGN PATENT DOCUMENTS

| | | |
|---|---|---|
| 2225011 | 12/1972 | Fed. Rep. of Germany . |
| 2502667 | 7/1976 | Fed. Rep. of Germany . |
| 414543 | 9/1982 | Sweden . |

Primary Examiner—F. L. Evans
Attorney, Agent, or Firm—Lorusso & Loud

[57] ABSTRACT

A method and a device for determining the desired middle line of a cylindrical object, such as a log. For example, to determine the rotating middle line of an object to be rotary-cut, the invention provides a method in which the diameter of the object and its change is recorded with at least one camera or some other image producing device from several angles, and the images thus produced are stored in a computer memory, after which the desired middle line can be calculated using ordinary logic and the image most suitable for the purpose.

9 Claims, 1 Drawing Sheet

METHOD AND DEVICE FOR DETERMINATION OF DESIRED MIDDLE LINE OF A CYLINDRICAL OBJECT SUCH AS A LOG

This is a continuation of application Ser. No. 653,244, filed on Sept. 5, 1984, now abandoned.

This invention is concerned with a method and a device for determining the desired middle line of a cylindrical object such as a log.

In the plywood industry, veneer is rotary-cut from a wooden log with a specially designed rotary-veneer lathe. The lathe is equipped with a blade assembly, spindles, and a positioner which brings the log to the spindles. Due to the irregular shape of a log, it is of great importance that the positioner positions the log in such a way that the veneer to be obtained will be whole and faultless as long as possible. This will ensure better utilization of the raw material.

As a rule, the positioners have three jaws or blades which, simultaneously, press the log at the ends. The places where the log is held constitute three points of a circle. This system will work faultlessly only with a perfect cylinder, and a log is not one. Instead, the following irregularities can be observed in logs:

the cross section of the log is irregular in shape; thus only the three points mentioned above are compatible with the revolving centre of the log determined by the positioner;

the log is always slightly bended so that the middle axles given by the two positioners may not conincide;

the log is always slightly deformed when being pressed in the positioner, which affects positioning;

knots, holes, and other irregularities at the place where positioner's jaws grab the log cause heavy losses of raw material.

Attempts have been made to solve these problems by using equipment which measures the thickness of the log by means of ultrasonic sound, thereby facilitating positioning. The drawback of this system is that ultrasonic sound is not a reliable method for measuring such non-homogenuous material as wood. In addition, no information on the straightness of the log is obtained.

This invention seeks to provide a new, fully automatic positioner which can be mounted on the existing mechanical positioners. It does not slow down the process because positioning is carried out separately from the lathe while another log is being cut. To achieve this, the invention is characterized in that the diameter of the log and its change is continuously monitored by means of at least one camera or other conventional image producing device, and that these images are stored in an electronic memory. Following this, the desired middle line is computed from the most suitable image using conventional calculational methods.

A light-based image production system is fast and reliable in all conditions. The possibility to obtain images of irregularly shaped objects from several directions makes it possible to produce a three-dimensional picture on the computer.

One of the applications of this invention is characterized in that the stored images are used to produce the rectangles indicating the usable diameters of the various projections of the object. These are parallel to the positioner middle line, and this is done by measuring the diameter of the object at several points. On the basis of the various projections it is possible to obtain a comparable measure of the amount of whole wood in the log, which is important information for rotary cutting.

One of the applications of this invention is characterized in that the usable diameter of the object is determined by measuring in pairs the distance from the middle line of the positioner to the contours of the picture. Thus the usable diameter is a product of the smallest sum of these pairs, and the position of the middle line of the usable diameter in relation to the middle line of the positioner is obtained by dividing the above sum by 2 and comparing. The position of the rectangles in the observation plane is recorded in relation to the known middle line of the positioner, which makes it possible to determine the middle lines of the rectangles, including their distance from the middle line of the positioner.

One of the applications of this invention is characterized in that two rectangles are selected in order to obtain the desired middle line. The picture which contains the smallest rectangle is used as a basis. After this, another rectangle is selected which is contained in a picture taken at a right angle to the first rectangle. This allows the middle line to be located with great accuracy so that as much faultless veneer as possible can be cut from the log.

One of the applications of this invention is characterized in that the logic generates two planes which are parallel to the observation angles and determined by the middle lines of the rectangles. Also, it produces the desired middle line of an essentially whole cylinder as an intersecting line of these planes as well as calculates the components of the distance of this new middle line from the middle line of the positioner by means of a simple algorithm.

The position of the desired middle line can be calculated because its distance from the positioner middle line is known from two different directions. Calculation itself is trivial and can be carried out by using various methods and coordinates for which reason it is not dealt with in detail here.

One of the applications of this invention is characterized in that when the rectangles are being formed in the pictures, minor irregularities in the surface of the object are overlooked in accordance with a pre-determined rule; otherwise the size of the rectangles would be disproportionately reduced. The greatest height of the rectangle is equal to the smallest radius of the object. If a minor slit, or hole, at the end of the log significantly reduced the smallest radius of the projection of the log, it would give an incorrect indication of the log surface suitable for cutting. Moreover, it would complicate the determination of the optimum middle line in later phases, too.

One of the applications of this invention is characterized in that the image recorded by a camera or some other device is the shadow of the object projected on a suitable background. The shadow picture provides sufficient information for this purpose. The advantages offerred by this method include the simplicity of the equipment and good resolution due to the use of two states only (black and white).

One of the applications of this invention is characterized in that the optimum middle line obtained is fed into the control logic which operates the positioner and re-adjusts it to the optimum line.

One of the applications of this invention is characterized in that the object is rotated from one observation angle to another stepwise using a pre-determined number of angles while the image producing equipment remains stationery. This is the most simple configuration because otherwise it would be necessary to move the sensitive cameras.

One of the applications of this invention is characterized in that there are two image producing devices positioned at an angle of 90 degrees to each other. This means that the object need be rotated only 90 degrees in order to obtain the necessary images.

One of the applications of this invention is characterized in that the image producing equipment consists of at least one raster diode camera. A raster diode camera is a simple device and eminently suitable for this kind of application because of the easy sampling of the picture elements.

A device based on this invention is characterized in that a conventional positioner is mounted on rotatable bows which turn the positioner around its middle line. Also, the positioner can be moved vertically and horizontally by means of its adjusting gear. When the positioner is moved forward or backward, the movements can be actuated with a built-in device, such as a hydraulic cylinder.

A device based on this invention is characterized in that there are two image producing devices, such as raster diode cameras, positioned at an angle of 90 degrees to each other, and the positioner can be rotated on the bows similarly 90 degrees. This solution provides the advantage that the raster diode cameras are easy to operate, and because only two of them are needed, the device is simple in construction.

A device based on this invention is characterized in that the rotating movements of the bows are controlled with an angle sensor which produces the impulses actuating the cameras at desired points.

Figure 2:
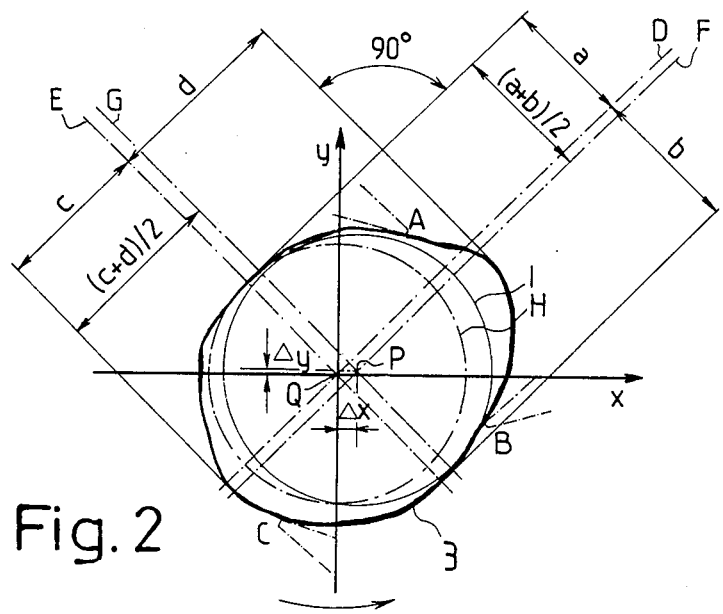
Figure 3:
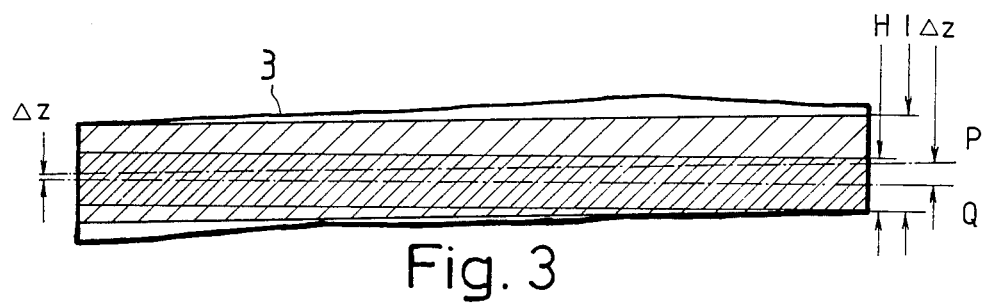

The invention is presented in greater detail below with reference to the enclosed drawings where:

FIGS. 1a and 1b present a side view of a positioner based on this invention; 1(a) the log in the initial position prior to measurement; 1(b) the log in the final position following the completion of measurement;

FIG. 2 presents a cross section of the log, including the values and pictures needed to implement the method this invention provides;

FIG. 3 presents a practical example of the correct positioning of a log.

The log 3 is brought to the positioner 4 in the position pictured in FIG. 1a and fixed at three points at both ends in such a way that their middle line is parallel to the middle line of spindles of the lathe. The adjusting gear 5 and 6 are in normal position.

The raster diode cameras are so positioned that the intersecting point of their middle lines is the spindle line of the lathe, removed in horizontal direction from the actual middle line of the spindle the same distance as the adjusting gear 7 can travel.

At this point, the positioner 4 and the log 3 are rotated with the bows 8 90 degrees until the position pictured in FIG. 1b is reached. While the log and the positioner are being rotated, the sensor 9 measures the angles, actuating the cameras 1 and 2 every 5 degrees. At 90 degrees to each other, the cameras measure the usable diameter of the log, covering 180 degrees of the log, which is equal to measuring the diameter of the log every 5 degrees.

The diameter is measured at several points along the length of the log. Measurements are used to identify the lowest usable diameter of the log, and the angle at which it was found is recorded.

The angle of the turn, the lowest usable diameter and the corresponding diameter of a cross section at a 90 degree angle to it, constitute the data which provides the location of the middle line of the biggest whole cylinder obtainable from the log. This data is fed into the control logic (such as a process computer) which, by means of adjusting gear 5 and 6, positions the optimum middle line of the log to coincide with the middle line of the spindles. FIGS. 1a and 1b illustrate the computer 10, with memory means 11, as used with the device of the present invention. The computer 10, since it receives data from the cameras is connected to cameras 1 and 2, and since it provides information regarding the adjustment of the spindles is shown attached to element 7. The movement is accomplished with machine 7.

FIG. 2 indicates how the smallest usable diameter of the log 3 is used in order to obtain the optimum middle line. The log is held in the positioner at both ends at points A, B and C which need not necessarily be in the same plane as in the drawing. The dotted lines D and E are the middles lines of the cameras 2 and 1 (not pictured here) and they intersect at the normal middle line of the positioner at a point which is marked Q. Here it is the origin of an xy coordinate. Let us assume that the cross section of the log displayed here is the worst diameter of the log, which is found with the raster diode camera 2 (not pictured here) when the log is being turned by measuring the distances a and b from the middle line D to the countours of the log at several points along the length of the log. The location of the middle line F of the smallest diameter in relation to D is obtained simply by calculating $(a+b)/2$.

After the smallest diameter $a+b$ is found, the computer memory provides the data recorded by the camera 1 at the corresponding angle of the turn. This data include the distances c and d measured from the middle line E to the contours of the log as well as the location of the middle line G of the picture $(c+d)/2$. For reasons of clarity, both measurements are here pictured in the same plane but this is naturally not the usual situation because the smallest diameters which determine the usable diameters of certain projections can be located at any place along the length of the log.

The middle lines F and G of the diameters intersect at the point P. At the same time this point constitutes the optimum middle line of the log, and its location in relation to the normal middle line of the positioner can be calculated without difficulty. In a rectangular coordinates deviations can be expressed as $\Delta x$ and $\Delta y$. These are fed into the moving equipment which effect the necessary adjustments whereby the optimum middle line is made to coincide with the spindle line of the lathe.

FIG. 2 gives also the cross section of the greatest cylinder H as well as the cross section of the cylinder I obtained by means of optimization.

Another example of the advantages offered by this method is provided in FIG. 3 which gives a side view of the correction of the middle line denoted by $\Delta z$. We see that the correction of the middle line varies from one place to another. This is due to the irregular shape of the log and the exceptional fixation of the log in the positioner resulting therefrom.

It is obvious to a professional man that the applications of this invention are not confined to the examples presented above but can vary within the framework of the patent claims presented hereunder.

We claim:

1. A procedure for determining an optimum axis or centerline of a generally cylindrical object such as a log, for further processing in a working machine such as a lathe, said procedure including the steps of:
   (a) fixing the object to be worked upon in a positioner operating in connection with the said working machine;
   (b) recording the diameter of the object along the length of the object with at least one image producing device, such as a camera, from different angles about a longitudinal axis of the object;
   (c) determining the size of the inscribed, largest possible essentially rectangular geometric figures obtained from each projection of the object produced at the corresponding angle;
   (d) storing the size of the inscribed, largest possible essentially rectangular geometric figures, obtained from each projection of the object produced at the corresponding viewing angle, in the memory of a computer;
   (e) calculating with the aid of said computer the smallest of the said figures and computing the intersecting line between this figure and another figure stored from a projection recorded at a predetermined angle relative to the angle at which the said smallest figure was recorded, and regarding said intersecting line as the optimum centerline of the object;
   (f) computing the location of said intersecting line in relation to the centerline of said positioner and transmitting the net distance components of any required shifting of the object to fixing elements of the positioner, so that the centerline of said positioner eventually coincides with said intersecting line.

2. A method according to claim 1, wherein two rectangular geometric figures are selected to obtain the desired centerline, a first rectangular geometric figure being said smallest inscribed rectangular geometric figure and the second rectangular figure being the figure viewed at a right angle in relation to said first figure.

3. A method according to claim 1, wherein the image recorded by a camera or a similar device is the shadow of the object projected on a suitable background.

4. A method according to claim 1, wherein the object is rotated from one observation angle to another stepwise using a desired number of angles while the image producing equipment remains stationary.

5. A method according to claim 1, where there are two image producing devices positioned at an angle of 90 degrees to each other.

6. A method according claim 1, wherein the image producing device comprises at least one raster diode camera.

7. A procedure according to claim 1, wherein the said essentially rectangular geometric figures are produced from projections of the object which are colinear with the centerline of the positioner.

8. A procedure according to claim 7, wherein the said rectangular figures are produced by measuring the values of a plurality of distance pairs from the positioner's centerline to the contours of each projection, whereby the width of the said figure is determined as the smallest sum of distance pairs in each projection.

9. A procedure for determining an optimum axis or centerline of a generally cylindrical object such as a log, for further process in a working machine such as a lathe, said procedure including the steps of:
   (a) fixing the object to be worked upon in a positioner operating in connection with the said working machine;
   (b) recording the diameter of the object along the length of the object with at least one image producing device, such as a camera, from different angles about a longitudinal axis of the object;
   (c) determining the size of the inscribed, largest possible essentially rectangular geometric figures obtained from each projection of the object produced at the corresponding angle;
   (d) storing the size of the inscribed, largest possible essentially rectangular geometric figures, obtained from each projection of the object produced at the corresponding viewing angle;
   (e) calculating the smallest of the said figures and computing the intersecting line between this figure and another figure stored from a projection recorded at a predetermined angle relative to the angle at which the said smallest figure was recorded, and regarding said intersecting line as the optimum centerline of the object;
   (f) computing the location of said intersecting line in relation to the centerline of said positioner and shifting the object in relation to fixing elements of the positioner, so that the centerline of said positioner eventually coincides with said intersecting line.

* * * * *